(12) United States Patent
Stokman

(10) Patent No.: US 10,592,879 B2
(45) Date of Patent: Mar. 17, 2020

(54) SYSTEM FOR DISTRIBUTING ELECTRICAL ENERGY

(71) Applicant: CITYTEC B.V., Alblasserdam (NL)

(72) Inventor: Henricus David Stokman, Aalsmeer (NL)

(73) Assignee: CURRENT OS IP B.V., Alsmeer (NL)

( * ) Notice: Subject to any disclaimer, the term of this patent is extended or adjusted under 35 U.S.C. 154(b) by 249 days.

(21) Appl. No.: 15/501,081

(22) PCT Filed: Jul. 21, 2015

(86) PCT No.: PCT/NL2015/050532
§ 371 (c)(1),
(2) Date: Feb. 1, 2017

(87) PCT Pub. No.: WO2016/018143
PCT Pub. Date: Feb. 4, 2016

(65) Prior Publication Data
US 2017/0255913 A1    Sep. 7, 2017

(30) Foreign Application Priority Data

Aug. 1, 2014 (NL) .................................... 2013296

(51) Int. Cl.
*G06Q 20/14* (2012.01)
*G01R 35/00* (2006.01)
(Continued)

(52) U.S. Cl.
CPC ........... *G06Q 20/145* (2013.01); *C23F 13/04* (2013.01); *G01R 22/063* (2013.01); *G01R 31/025* (2013.01); *G01R 35/005* (2013.01); *G06Q 50/06* (2013.01); *H02H 3/087* (2013.01); *H02H 3/52* (2013.01); *H02H 7/268* (2013.01); *H02J 1/00* (2013.01); *H02J 1/02* (2013.01); *H02J 13/0003* (2013.01); *C23F 2213/11* (2013.01); *H02J 1/102* (2013.01); *H02J 4/00* (2013.01);
(Continued)

(58) Field of Classification Search
CPC . G01R 31/25; H02H 3/53; H02H 3/52; H02H 3/87
See application file for complete search history.

(56) References Cited

U.S. PATENT DOCUMENTS 4,819,180 A   4/1989  Hedman et al.
8,552,590 B2 * 10/2013  Moon ....................... H02J 3/32
                                                         307/64
(Continued)

FOREIGN PATENT DOCUMENTS

EP    0825701 A2    2/1998
JP    2013172589 A   9/2013

OTHER PUBLICATIONS

International Search Report and Written Opinion issued in PCT/NL2015/050532, dated Jan. 15, 2016.
(Continued)

*Primary Examiner* — Dominic E Hawkins
(74) *Attorney, Agent, or Firm* — Heslin Rothenberg Farley & Mesiti P.C.

(57) ABSTRACT

The present invention relates to a system for distributing electrical energy, comprising an electricity grid configured to supply electrical energy to end users, characterized in that the grid is operated on a direct voltage.

3 Claims, 14 Drawing Sheets

(51) Int. Cl.

| | | |
|---|---|---|
| *G01R 31/02* | (2006.01) | |
| *C23F 13/04* | (2006.01) | |
| *G01R 22/06* | (2006.01) | |
| *H02H 3/087* | (2006.01) | |
| *H02H 3/52* | (2006.01) | |
| *H02J 1/00* | (2006.01) | |
| *H02J 13/00* | (2006.01) | |
| *H02H 7/26* | (2006.01) | |
| *H02J 1/02* | (2006.01) | |
| *G06Q 50/06* | (2012.01) | |
| *H02J 1/10* | (2006.01) | |
| *H02J 4/00* | (2006.01) | |

(52) U.S. Cl.
CPC ........... *Y02B 90/228* (2013.01); *Y02B 90/244* (2013.01); *Y04S 20/18* (2013.01); *Y04S 20/327* (2013.01); *Y04S 20/36* (2013.01)

(56) References Cited

U.S. PATENT DOCUMENTS

| | | | |
|---|---|---|---|
| 9,152,737 B1* | 10/2015 | Micali | G06F 16/9024 |
| 2007/0035290 A1 | 2/2007 | Schweigert et al. | |
| 2010/0094476 A1* | 4/2010 | Hamilton, II | G01D 4/004 |
| | | | 700/295 |
| 2010/0320837 A1* | 12/2010 | Harrison | H02J 3/36 |
| | | | 307/26 |
| 2012/0019965 A1* | 1/2012 | Faxvog | H02H 3/52 |
| | | | 361/42 |
| 2012/0150679 A1* | 6/2012 | Lazaris | G06Q 30/0605 |
| | | | 705/26.2 |
| 2013/0138366 A1* | 5/2013 | Yan | H02H 7/261 |
| | | | 702/58 |
| 2013/0175992 A1 | 7/2013 | Tinaphong et al. | |
| 2013/0308229 A1* | 11/2013 | Faxvog | H02H 7/04 |
| | | | 361/35 |
| 2014/0039706 A1* | 2/2014 | Siaudeau | H02J 13/0006 |
| | | | 700/287 |
| 2014/0159485 A1* | 6/2014 | Daniel | H02J 1/14 |
| | | | 307/24 |
| 2014/0268468 A1* | 9/2014 | Sheng | H01H 33/596 |
| | | | 361/115 |
| 2014/0346896 A1* | 11/2014 | Lumsden | G01R 21/00 |
| | | | 307/126 |
| 2015/0066231 A1* | 3/2015 | Clifton | H02J 7/0068 |
| | | | 700/296 |
| 2015/0092311 A1* | 4/2015 | Wang | H02H 1/043 |
| | | | 361/86 |
| 2017/0149244 A1* | 5/2017 | Recio | H02J 3/16 |

OTHER PUBLICATIONS

Fletcher et al., "Optimizing the Roles of Unit and Non-unit Protection Methods Within DC Microgrids," IEEE Transactions on Smart Grid, vol. 3, No. 4, pp. 2079-2087 (2012).

* cited by examiner

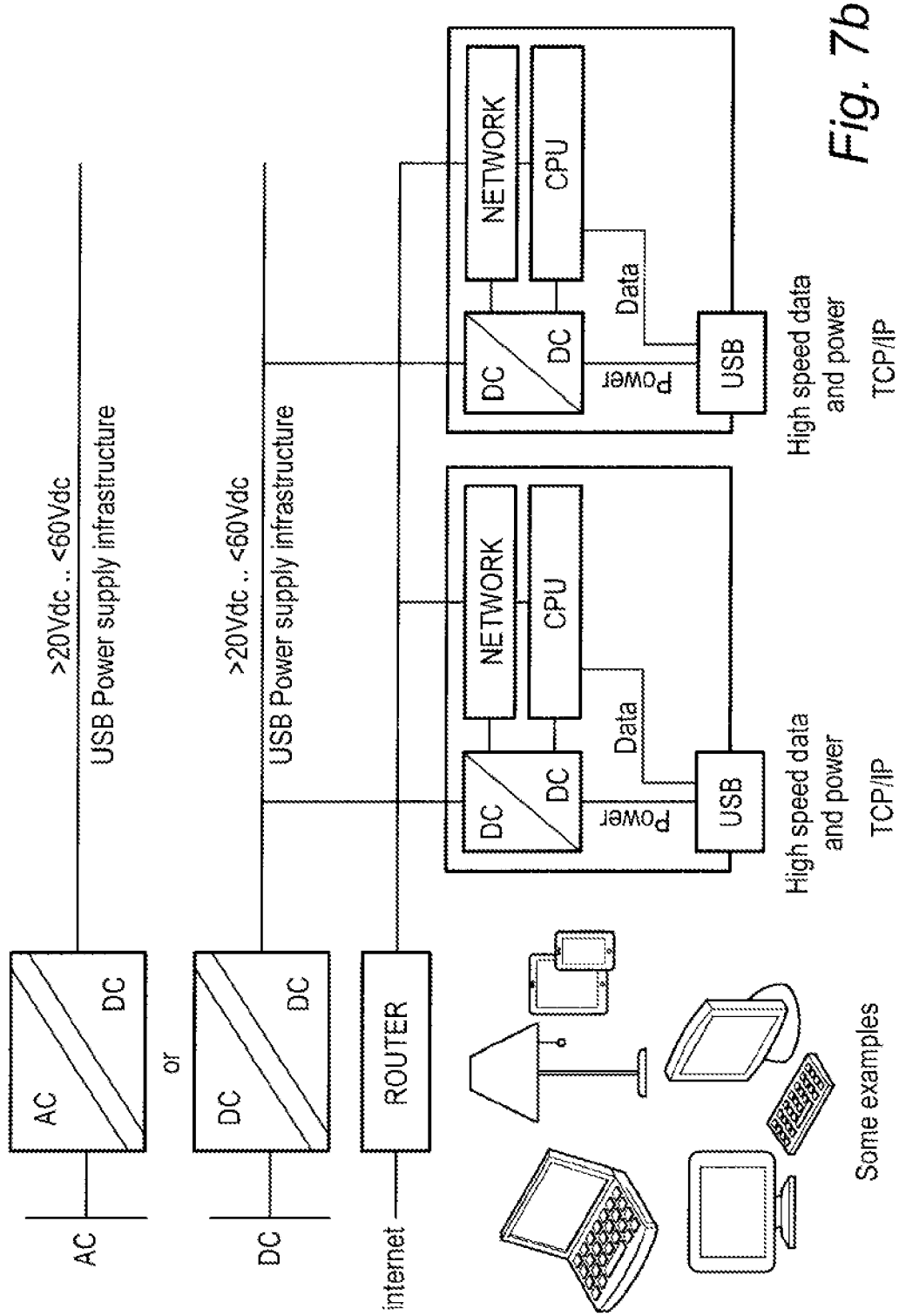

SYSTEM FOR DISTRIBUTING ELECTRICAL ENERGY

CROSS REFERENCE TO RELATED APPLICATIONS

This application is the National Phase filing under 35 U.S.C. § 371 of International Application No. PCT/NL2015/050532, filed on Jul. 21, 2015, and published on Feb. 4, 2016, as WO/2016/018143 A2, and claims priority to The Netherlands Application No. 2013296, filed on Aug. 1, 2014. The contents of each of the prior applications are hereby incorporated by reference herein in their entirety.

FIELD OF INVENTION

The invention relates generally to a system for exchanging electrical energy.

BACKGROUND

The present invention relates to a system for exchanging electrical energy. Such systems, generally known as electricity distribution networks, are everywhere known. Electrical energy has been transported from the point where it is generated to the end user via such networks for many years, wherein it is generally the case that a high alternating voltage is used from the point of generation to the point of distribution close to the end user, and the further distribution from there is carried with a medium and low voltage network. Almost everywhere in the world these are in practice alternating voltage networks wherein a frequency of 50 to 60 Hz is applied. For reasons of standardization and the long-held belief that this manner of distributing energy has advantages, particularly in respect of the possibility of protection and low transport losses, direct voltage distribution has never become widespread.

It is however an object of the present invention to provide an alternative to the above stated alternating current distribution, and in particular to obviate a number of supposed drawbacks associated therewith.

The present invention proposes for this purpose a system for distributing electrical energy, comprising an electricity grid configured to supply electrical energy to end users, which grid is operated on a direct voltage.

In order to facilitate the use of such a grid the invention further proposes a protection device for the above stated system, configured to detect change in a power consumption at the connection of an end user and to limit the power consumption at the connection of the end user if the change is greater than a predetermined threshold value.

In contrast to the usual protection devices in which a threshold value for current or voltage is applied, detection of an irregularity, such as an unintended short-circuit or other excess power consumption, takes place by detecting an excessive increase in consumed power, for instance an excessive increase in consumed current. Particularly when such an increase takes place suddenly, and a step is thus visible in the power consumption graph, it is established according to the invention that an irregularity is occurring.

Such a step form is readily detectable by monitoring a frequency analysis of the power consumption. This is because a step form comprises a large number of harmonics which do not occur in a gradual transition. In a preferred embodiment the protection device is therefore configured to detect a change on the basis of the measured presence of harmonic current or voltage components. It can in addition be configured to detect the power consumption and to limit or shut off the connection of the end user if the power consumption is greater than a predetermined threshold value.

No power is available in de HF time domain, though power is available in the LF (low-frequency) time domain. The user may therefore not switch on according to a square wave method but with a ramp-up method. In short, no harmonic HF (high-frequency) signals may be present, since this would indicate a fault.

No power is available for a short moment. For instance in the case of a short-circuit. When a current of 10 A flows and a short-circuit occurs, 10 A still flows at 0 volt, which is 0 Watt. If the current increases, shut-off takes place at that moment, whereby no spark, arc or generation of heat takes place.

The commercial solution for DC according to the prior art is to allow the fault to escalate, whereby the weakest component fails, usually a form of a fuse which becomes defective, with the drawback that semiconductors also regularly become defective.

The present invention makes it possible to build an efficient and reliable infrastructure. In a normal situation the behaviour is as in a so-called hard network, i.e. users can consume power within their permitted range. Should unexpected currents occur however, this is seen as a fault and the relevant LVDC connection will become energy-free.

The protection is configured such that the HF current behaviour with an absolute nominal protection is watched. This has the consequence that users have to comply with a determined power-on behaviour in order to ensure that the protection is not activated.

The invention also relates to a device for billing energy consumption within a system according to any of the foregoing claims, comprising a connection for consumption of electrical energy from an electricity grid, a connection for supplying electrical energy to a consumer connection, a connection for data communication with an administrator of the electricity grid, a metering device connected to the connection for consumption and to the connection for data communication and configured to monitor the amount of electrical energy consumed at the consumption point; and to monitor the moment the electrical energy is consumed; a data processing unit connected to the metering device and to the connection for data communication and configured to determine, via the connection for data communication, the electric power available for consumption at the connection, to determine, via the connection to the metering device, the power consumed, and to make available to an output for data output the amount of the electric power available for consumption at the connection.

n a preferred embodiment this device for billing energy consumption is coupled to a control member which is configured to set a target value for the consumed electrical energy, to consume the target value of electrical energy, to supply electrical energy to an energy buffer coupled to the control member when the electrical energy actually consumed by users connected to the control member is less than the target value; and to draw electrical energy from the energy buffer coupled to the control member when the electrical energy actually consumed by users connected to the control member is greater than the target value.

The device provides the advantage that there is a strict separation (at least in terms of data) between supplier (network administrator) and consumer (customer), resulting in maximum privacy. The supplier can only look at consumption data and communicate available power levels, while the user has a free choice of whether to accept the available power or not. If use is made of a control panel a constant use can be created by the consumer, whereby a user profile cannot be retrieved. The communication is controlled here in commercial manner and energy supply-driven instead of energy demand-driven as in the prior art.

Another aspect of the present invention relates to a device wherein a measuring device is arranged in series with a first pole of the connection for delivering electrical energy to a consumer connection for the purpose of measuring a current level, and wherein a controller is provided for the purpose of breaking, on the basis of the measured signal, the connection between the connection for consumption of electrical energy from an electricity grid and the connection for delivering electrical energy to a consumer connection, and wherein a coil is arranged in series with a second pole for the purpose of preventing rapid fluctuations in the current level.

This coil protects the semiconductors and has for this purpose a value large enough to ensure that, in the case of a short-circuit, the current has not changed yet within the time needed by the controller for measurement. During the short-circuit the current will increase over time, depending on the value of the coil. When the current exceeds a threshold value the electronic switch is opened. The current flowing at that moment is then taken over by the diode. At that moment the voltage is equal to the voltage drop over the diode, which as a rule is less than one Volt. Harmonic currents will be generated if electrical arcing occurs in the network.

When the connection between the connection for consumption of electrical energy from an electricity grid and the connection for delivering electrical energy to a consumer connection is broken, the controller particularly connects the connection for delivering electrical energy to a consumer connection to a power supply.

Yet another aspect of the present invention relates to a device for preventing corrosion of metal reinforcing parts in buildings in the vicinity of a system as stated above, comprising a measuring device for determining a current, in particular a leakage current, through a metal reinforcing part and a device for injecting a current into the system, wherein a control device is provided for injecting the current such that the current through the metal reinforcing part becomes zero.

Leakage currents in DC can cause corrosion. However, by compensating the leakage currents in the grounding system the concrete reinforcing bars in for instance parking garages can be protected by the grounding configuration, with the result that a poor DC behaviour now contributes toward protection of buildings or structures.

The invention further provides a method for calibrating a leakage current detection device for use in a system according to claim 1, comprising the steps of injecting a known test current during operation; measuring the response; designating the response not correlated to the test current as leakage current; designating a subsequently measured current which differs from the leakage current as faulty and repeating the foregoing steps at a predetermined interval.

A great problem in DC leakage current detection has heretofore been that it is difficult to detect a difference between offset caused by a defect and leakage current. This is solved by the present invention by injecting a known positive and negative leakage current during operation so as to thus be able to see whether the system is working. In off-position the system is calibrated to offset and in on-position correct leakage measurement is monitored. In order to be able to determine with a high reliability that the system is operational, it is possible to opt to do this every hour so that the ground leakage system is continuously checked.

Yet another aspect of the present invention relates to a method for determining the sequence of electrical elements in a ladder network, wherein the electrical elements are provided with a measuring device for measuring the voltage with which they are supplied and a communication device for communicating via their power connection at least the measured voltage and a unique code to a control device, and which are configured to receive via the communication device power-on or power-off instructions, comprising of supplying a reference voltage to each of the electrical elements prior to their being placed in the ladder, placing the electrical elements in the ladder network, detecting the unique codes of the electrical elements present with the control device, switching the electrical elements on and off one by one and receiving the voltage measured by the electrical elements with the control device, and determining the sequence in which the electrical elements are present in the ladder on the basis of the general principle that the higher the voltage measured, the closer to the voltage source.

BRIEF DESCRIPTION OF THE DRAWING FIGURES

The invention will now be elucidated in more detail with reference to the following figures. Herein:

FIGS. 7a-c show a consumer connection in which electrical apparatuses are connected by means of a USB connection.

DETAILED DESCRIPTION

Figure 1:
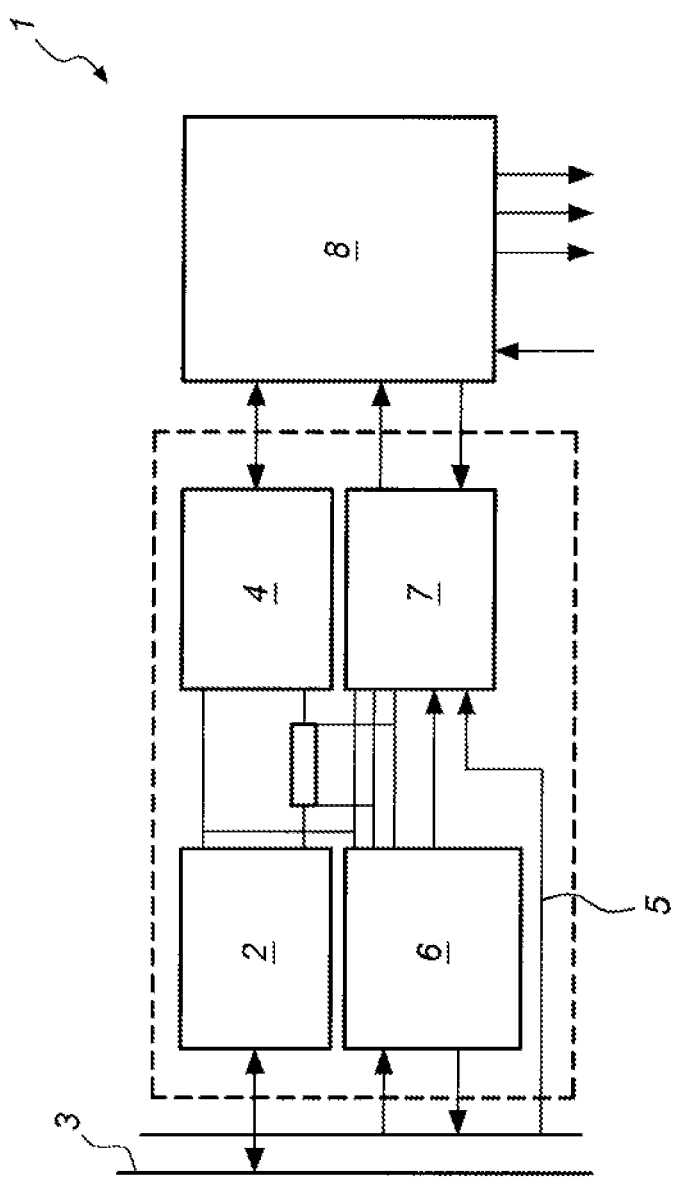
FIG. 1 shows a device for billing energy consumption.

FIG. 1 shows a device 1 for balancing energy consumption, comprising a connection 2 for consumption of electrical energy from an electricity grid 3, a connection 4 for delivering electrical energy to a consumer connection, a connection 5 for data communication with an administrator of the electricity grid, a metering device 6 connected to the connection for consumption and to the connection for data communication and configured to monitor the amount of electrical energy consumed at the consumption point; and to monitor the moment the electrical energy is consumed; a data processing unit 7 connected to the metering device and to the connection for data communication and configured to determine, via the connection for data communication, the electric power available for consumption at the connection, to determine, via the connection to the metering device, the power consumed, and to make available to an output for data output the amount of the electric power available for consumption at the connection.

In a preferred embodiment this device for billing energy consumption is coupled to a control member 8 which is configured to set a target value for the consumed electrical energy, to consume the target value of electrical energy, to supply electrical energy to an energy buffer coupled to the control member when the electrical energy actually consumed by users connected to the control member is less than the target value; and to draw electrical energy from the energy buffer coupled to the control member when the electrical energy actually consumed by users connected to the control member is greater than the target value. set a target value.

Figure 2:
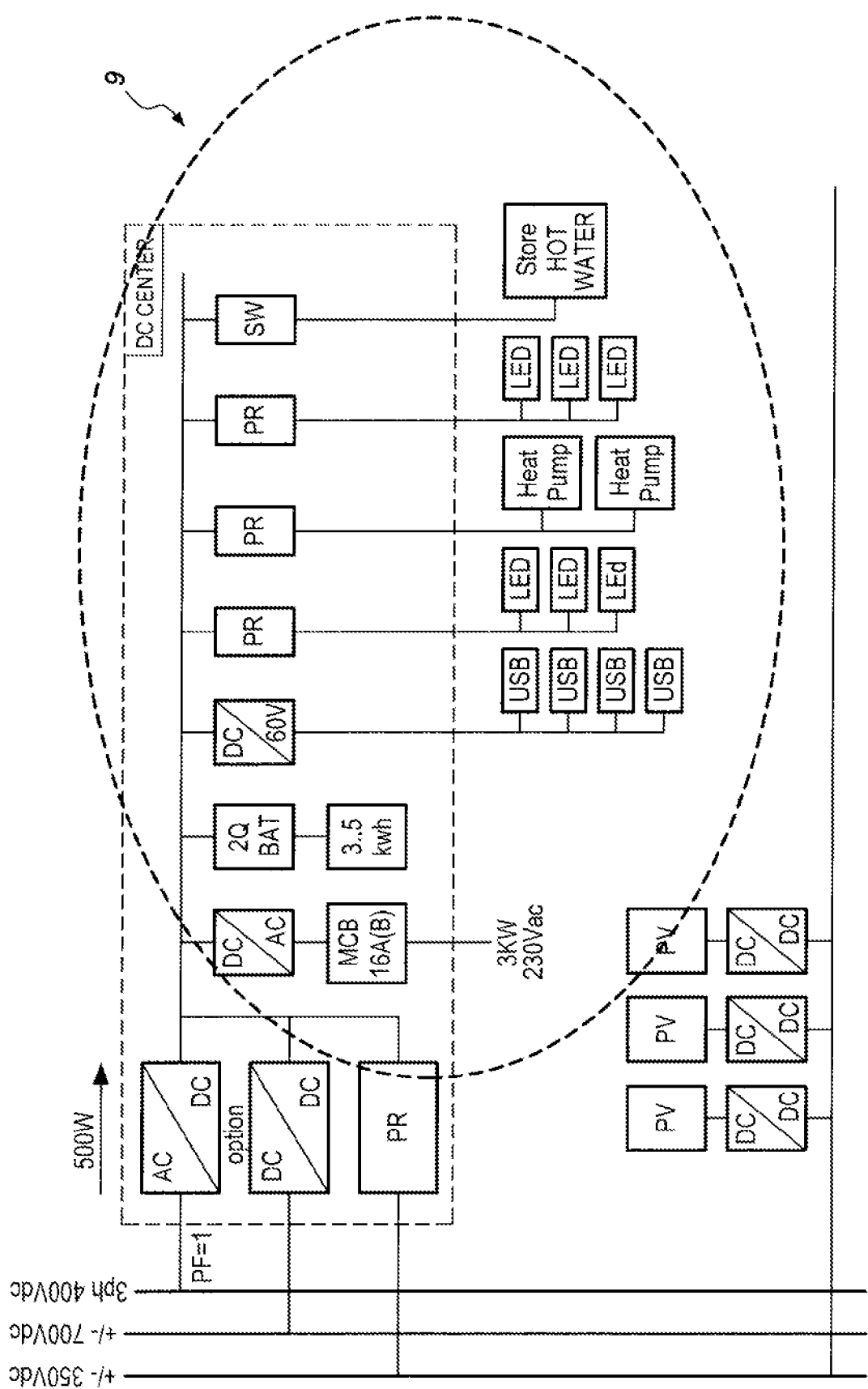
FIG. 2 shows a detail of a device according to FIG. 1.

FIG. 2 shows a detail 9 of a system according to FIG. 1, wherein so-called congestion management is performed. There is a constant supply, which can be fully planned/adjusted. A constant power with a guaranteed lower threshold value is made available from the grid, optionally supplemented with "happy hour" power, whereby a "smart grid" is constructed downstream of the meter (within the indicated circle) instead of upstream of the meter. This achieves that each apparatus consumes power in accordance with a priority schedule. There is no master in the system, each apparatus comprises intelligence.

Figure 3:
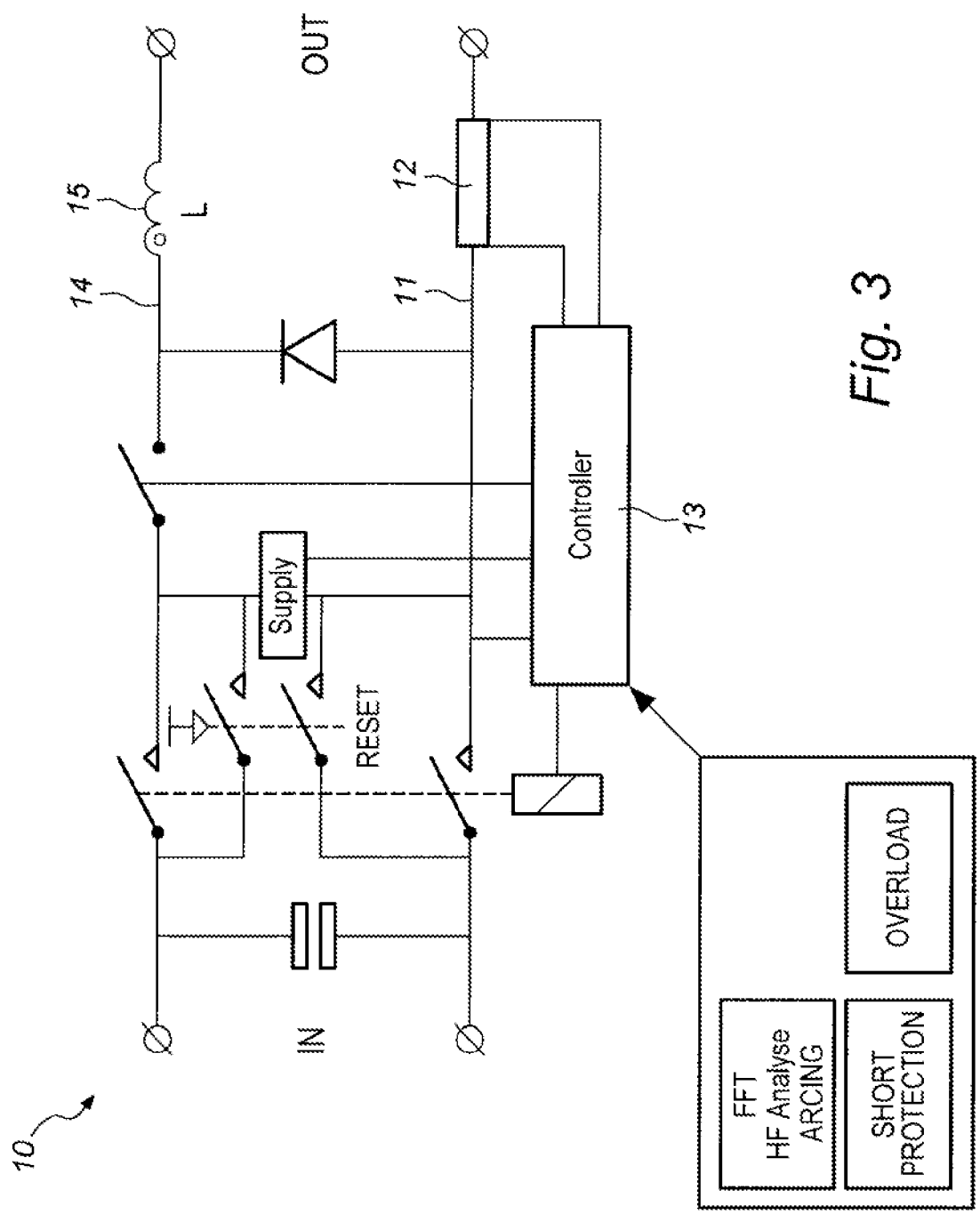
FIG. 3 shows a protection device according to the present invention.

FIG. 3 shows a protection device 10 according to the present invention, wherein a measuring device 12 is arranged in series with a first pole 11 of the connection for delivering electrical energy to a consumer connection for the purpose of measuring a current level, and wherein a controller 13 is provided for the purpose of breaking, on the basis of the measured signal, the connection between the connection for consumption of electrical energy from an electricity grid and the connection for delivering electrical energy to a consumer connection, and wherein a coil 15 is arranged in series with a second pole 14 for the purpose of preventing rapid fluctuations in the current level.

When the connection between the connection for consumption of electrical energy from an electricity grid and the connection for delivering electrical energy to a consumer connection is broken, the controller particularly connects the connection for delivering electrical energy to a consumer connection to a power supply.

Figure 4:
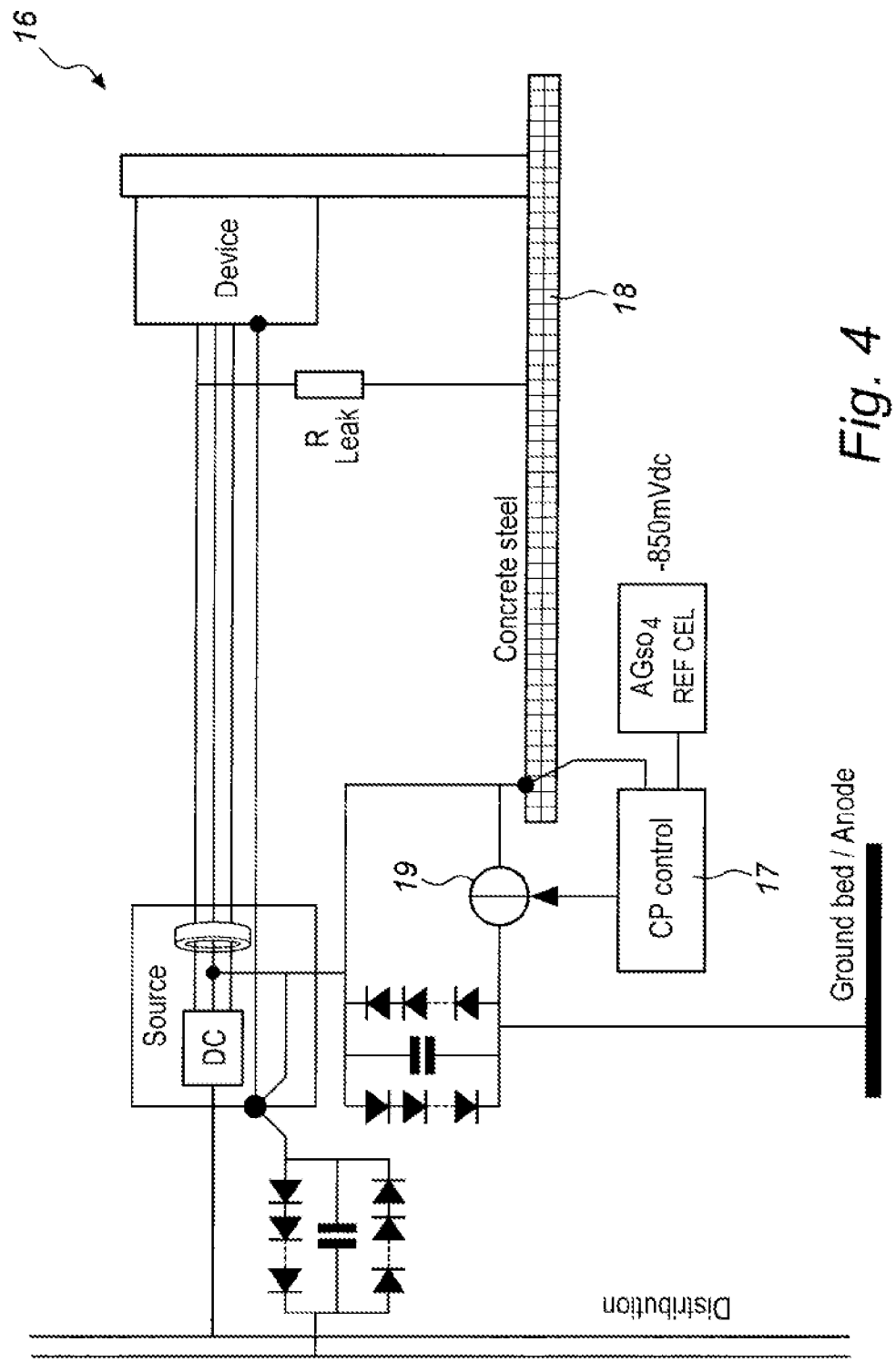
FIG. 4 shows a device for preventing corrosion of metal reinforcing parts in buildings.

FIG. 4 shows a device 16 for preventing corrosion of metal reinforcing parts in buildings, comprising a measuring device 17 for determining a current, in particular a leakage current, through a metal reinforcing part 18, and a device 19 for injecting a current into the system, wherein a control device is provided for injecting the current such that the current through the metal reinforcing part becomes zero. The unit designated with $AgSO_4$ is a reference cell used inside the device to measure galvanic potentials. Both silver sulfate and copper sulfate are suitable.

Figure 5A:
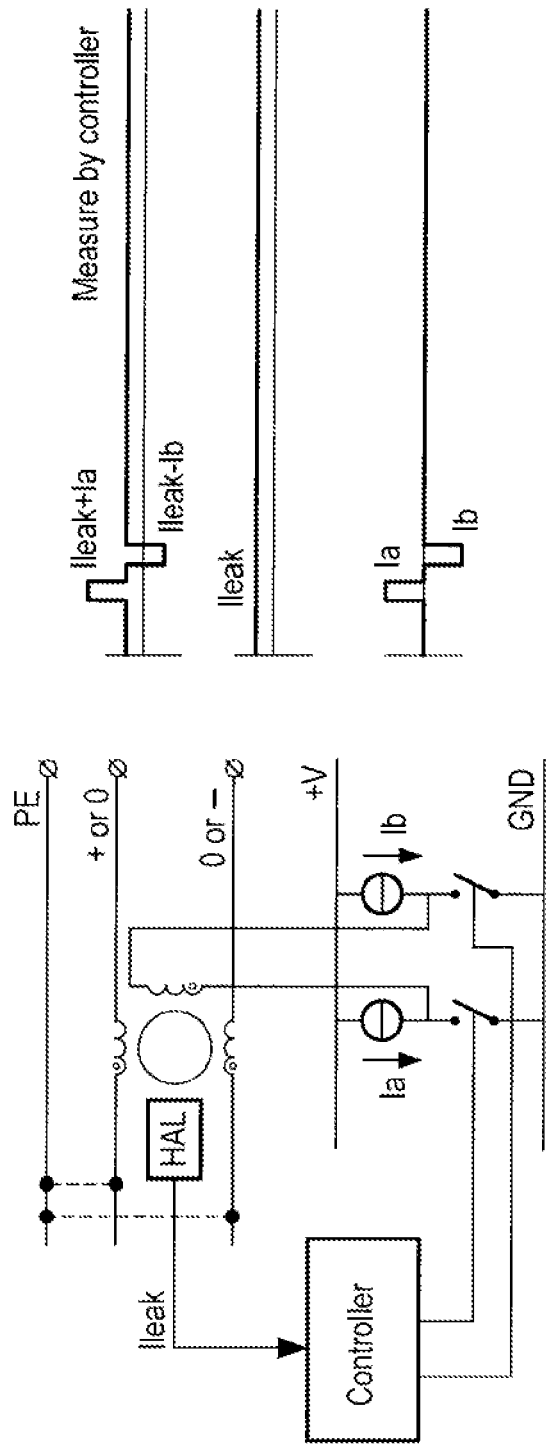
FIG. 5a shows a device and graphs of current curve during a method for calibrating a leakage current detection.

FIG. 5a shows a device and graphs of current curve during a method for calibrating a leakage current detection, comprising the steps of injecting a known test current during operation; measuring the response; designating the response not correlated to the test current as leakage current; designating a subsequently measured current which differs from the leakage current as faulty and repeating the foregoing steps at a predetermined interval.

Figure 5B:
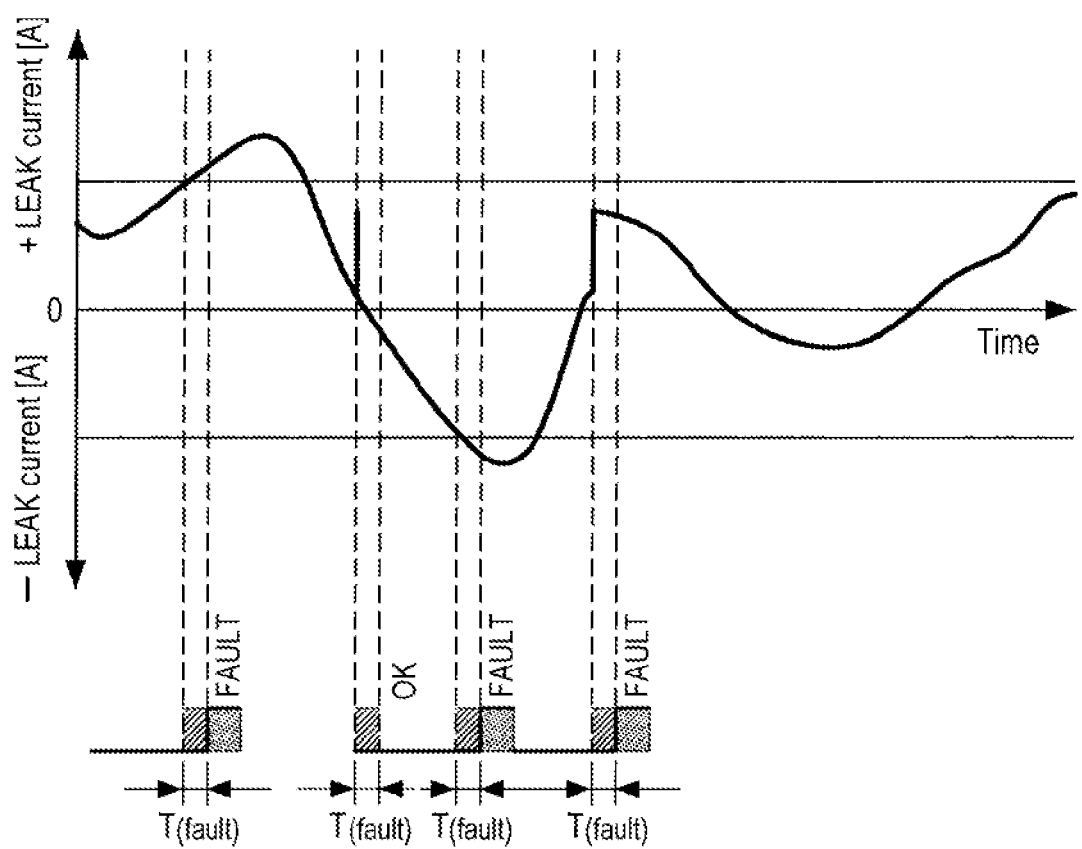
FIG. 5b shows a graph which indicates when a fault is established.

FIG. 5b is a graph which shows when a fault is determined.

Figure 5C:
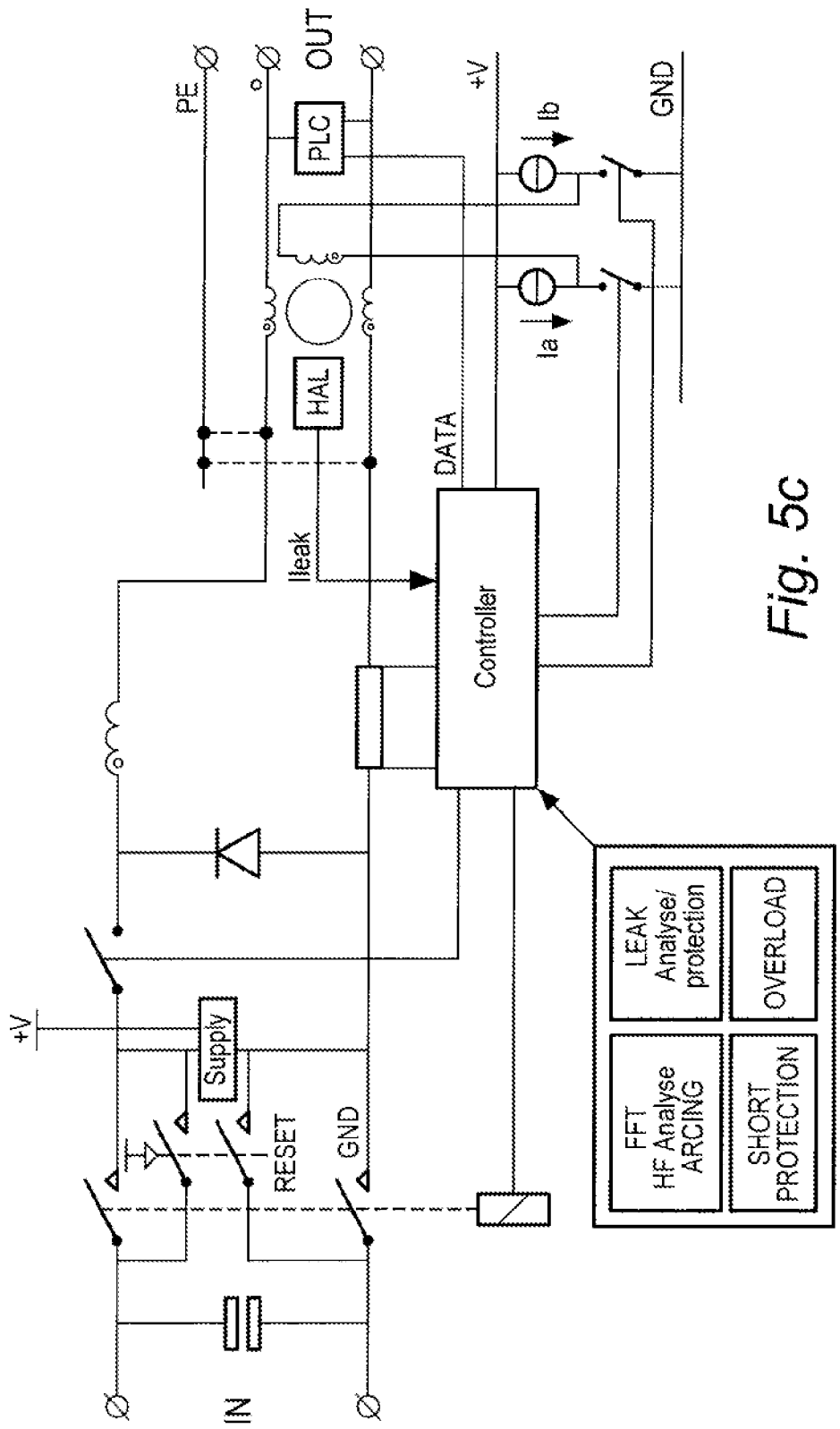
FIG. 5c shows a DC protection system with communication.

FIG. 5c shows a DC protection system with communication consisting of a power line communication (PLC), overload protection, shorting protection, ground leakage protection.

Figure 5D:
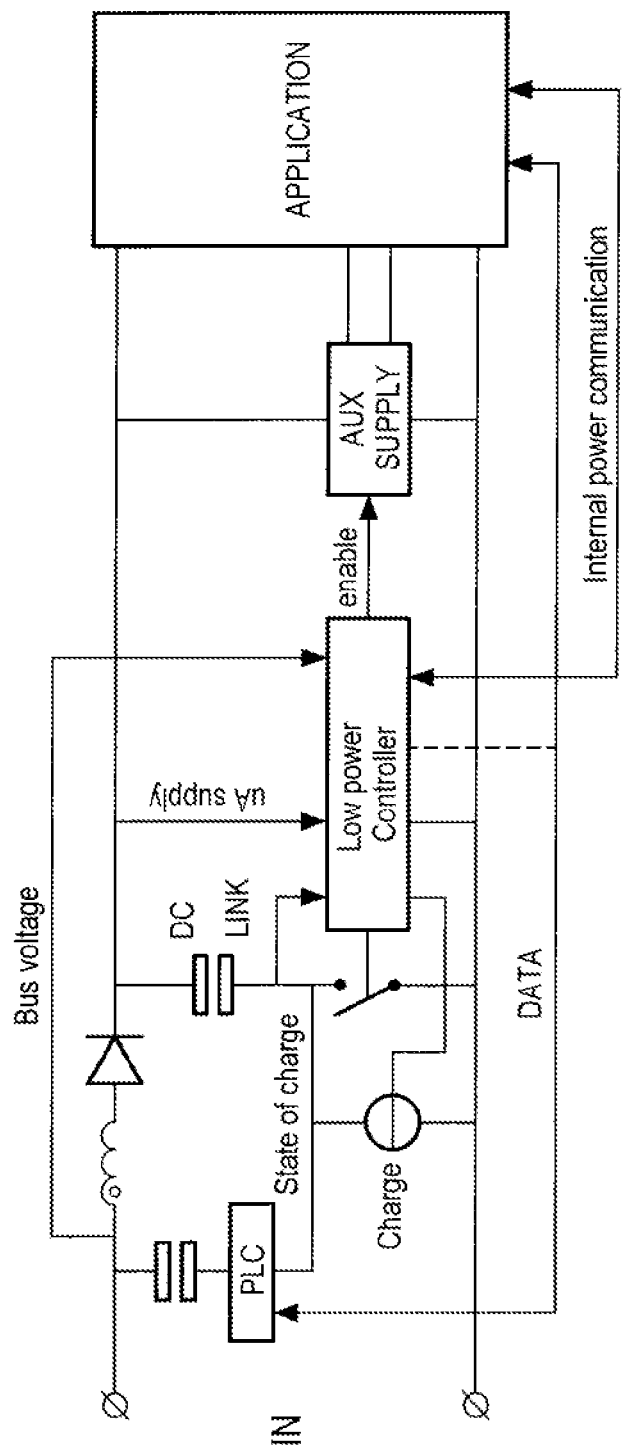
FIG. 5d shows a safe power-on circuit which ensures that users can switch on in a non-shorting network.

FIG. 5d shows a safe power-on circuit which ensures that users can switch on in the case of a non-shorting network.

Figure 5E:
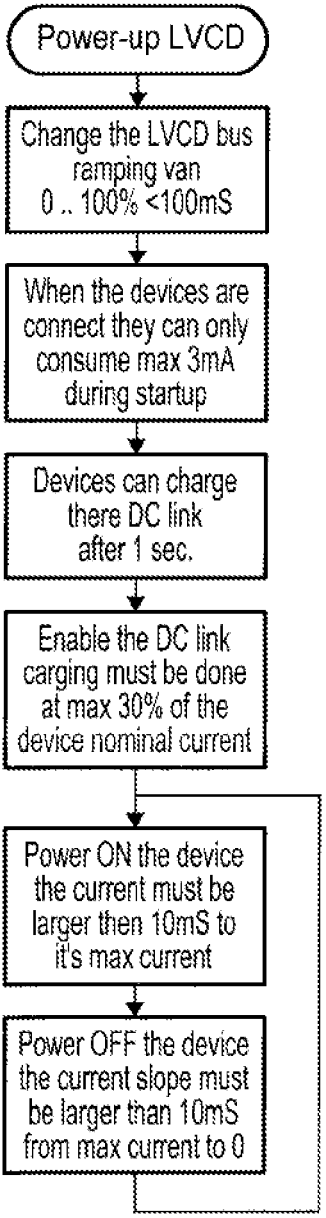
FIG. 5e shows a circuit which makes it possible to realize a non-shorting network.
Figure 5E:
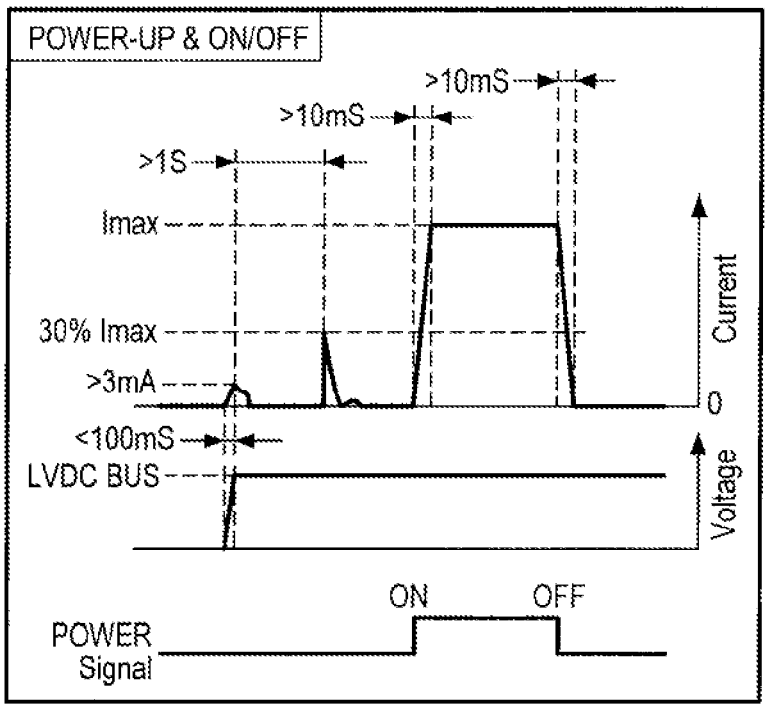

FIG. 5e shows a circuit which makes it possible to realize a non-shorting network. Users can switch on by means of this circuit without short-circuit power, which is normally not possible, but is possible here because the conditions have been defined, the current lies wholly in the LF range, whereby the protection does not intervene, the current is fully under control, and operates according to the ramp-up method.

Figure 6A:
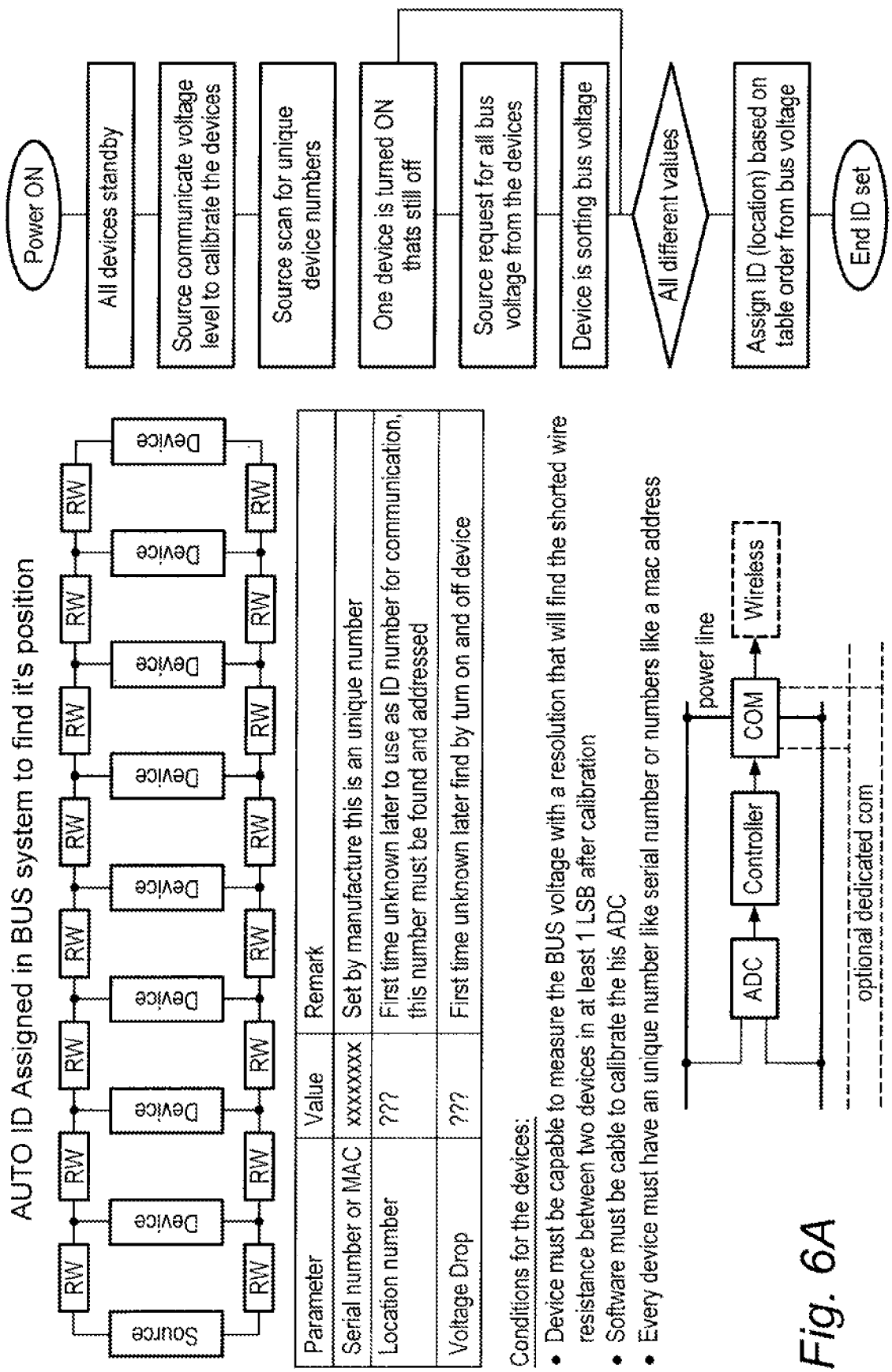
FIGS. 6a and 6b show a method for determining the sequence of electrical elements in a ladder network.
Figure 6B:
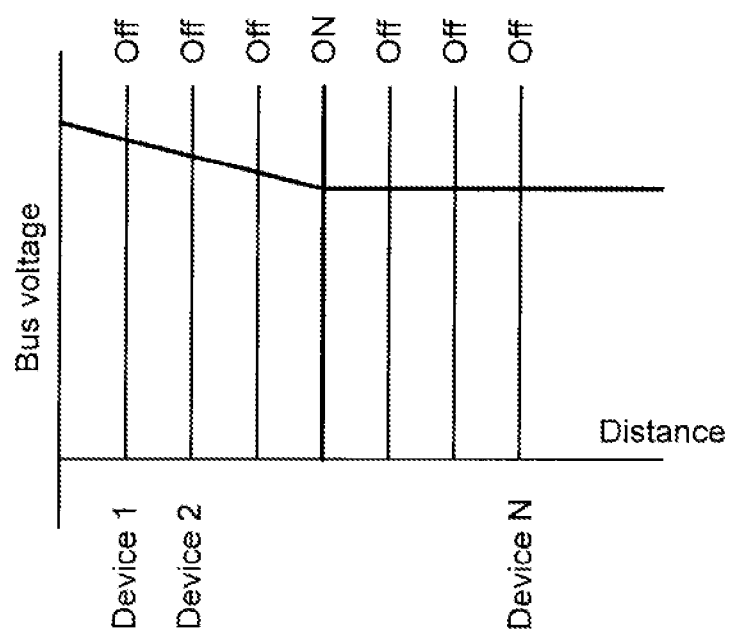

FIGS. 6a and 6b show a method for determining the sequence of electrical elements in a ladder network, wherein the electrical elements are provided with a measuring device for measuring the voltage with which they are supplied and a communication device for communicating via their power connection at least the measured voltage and a unique code to a control device, and which are configured to receive via the communication device power-on or power-off instructions, comprising of supplying a reference voltage to each of the electrical elements prior to their being placed in the ladder, placing the electrical elements in the ladder network, detecting the unique codes of the electrical elements present with the control device, switching the electrical elements on and off one by one and receiving the voltage measured by the electrical elements with the control device, and determining the sequence in which the electrical elements are present in the ladder on the basis of the general principle that the higher the voltage measured, the closer to the voltage source. The incoming DC voltage is measured with a low power controller. Each device per se comprises an ADC, which ADC is calibrated by a source. A random device is then switched on, and measurement takes place again. The difference between the values indicates the voltage difference (for instance 16 bits precisely) and the ID sequence on the bus is determined on the basis hereof. These numbers can be used for location determination.

Figure 7A:
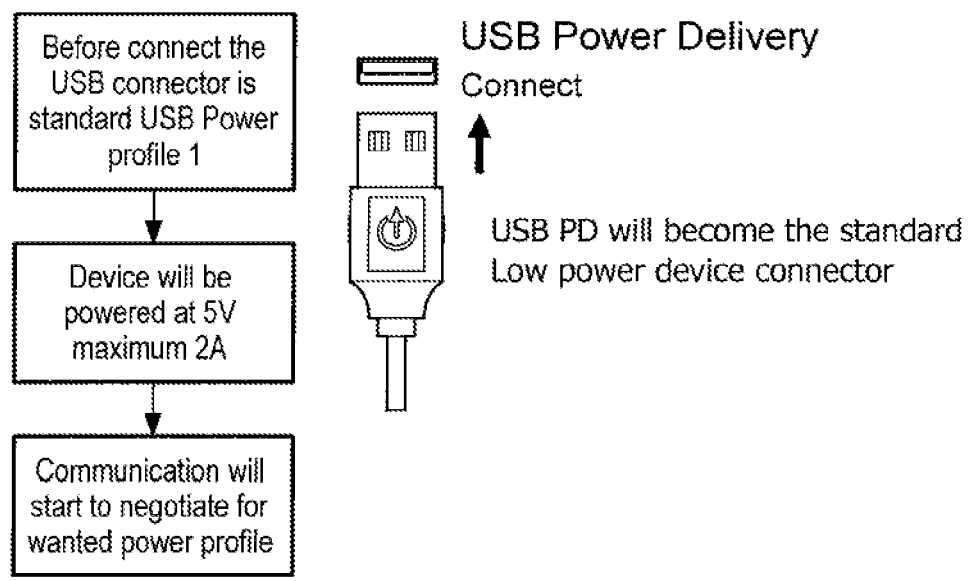
Figure 7C:
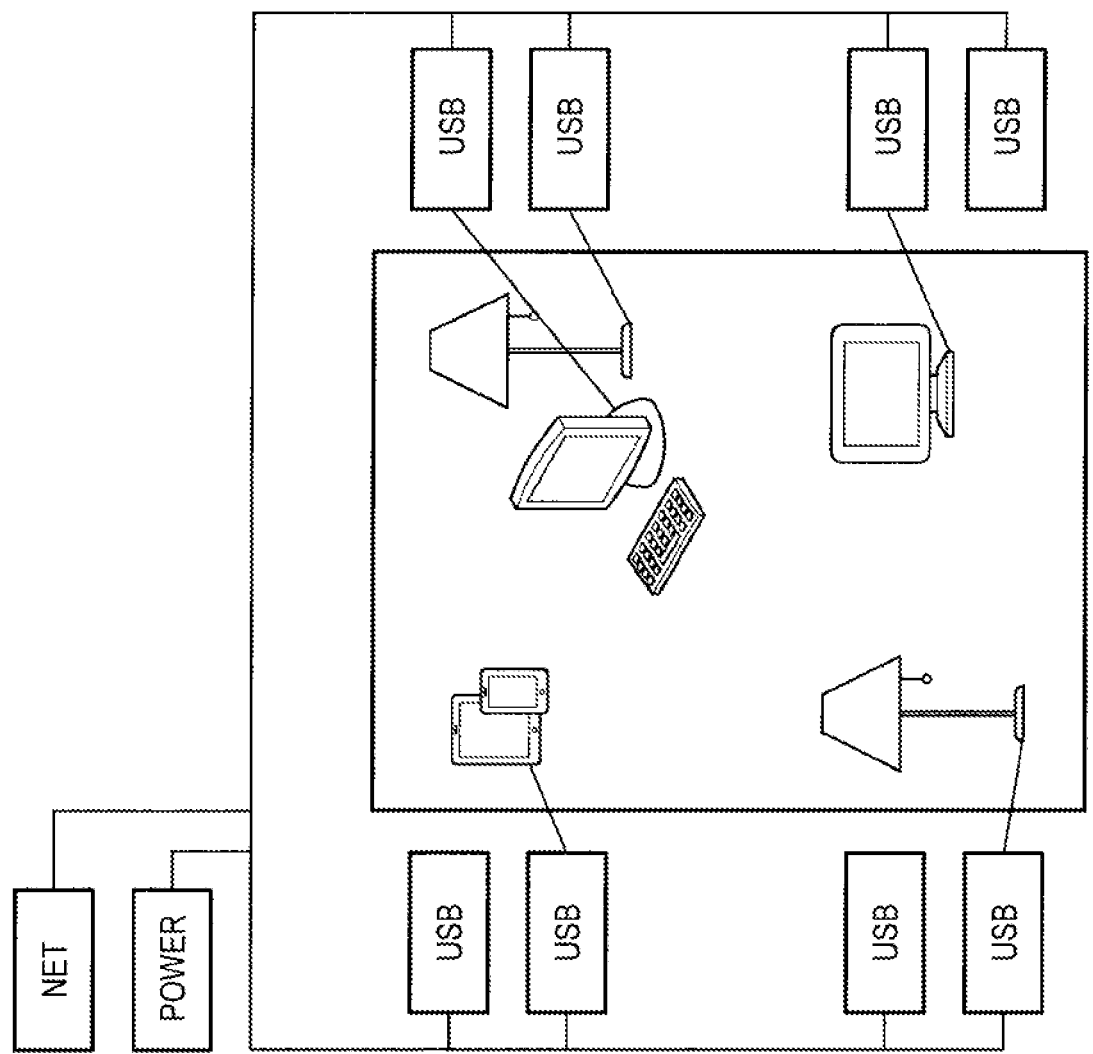

FIGS. 7a-c show a consumer connection in which electrical apparatuses are connected by means of a USB connection, over which power and data transfer takes place.

The small users are powered by a USB PD 1.0 connection. A number of power profiles up to 100 W are now available within this set standard; these can be expanded in future to for instance 60 V at 5 A, which can produce a power of 300 W. Opted for is to make a network with a safe low voltage specially for USB power supply and to place a non-insulated DC/DC in the connection point. These are very compact and efficient, whereby they can be built in. The USB connection can also be configured to make data available to a television or computer, whereby all apparatuses require a single connection. This can for instance also be a standard lamp which can be operated via the network. Operation takes place with a main power supply, and small power supplies are used locally in order to provide power in combination with the USB data, which behaves as ethernet. This for instance means that a laptop is provided with ethernet (TCP/IP) and power from the USB PD, so every user is then connected to ethernet, whereby home automation and power supply are combined.

The above stated examples are purely illustrative and in no way serve to limit the scope of protection of the present application as defined in the following claims.

The invention claimed is:

1. A system for distributing electrical energy, comprising:
    an electricity grid configured to supply electrical energy to end users, characterized in that the grid is operated on a direct voltage; and
    a protection device configured to detect change in a power consumption at the connection of an end user, to regulate a predetermined threshold value, and to limit the power consumption at the connection of the end user if the change is greater than the predetermined threshold value;
    wherein the protection device is configured to detect a change on the basis of the measured presence of harmonic current or voltage components.

2. The system of claim 1, wherein the protection device is configured to detect the power consumption and to limit or shut off the connection of the end user if the power consumption is greater than the predetermined threshold value.

3. The system of claim 1, further comprising a user connection, wherein said user connection is provided with USB connections for electrical apparatuses, and wherein said USB connections are configured for power and data transfer.

* * * * *